US012686123B2

(12) United States Patent　　(10) Patent No.:　US 12,686,123 B2
Lee et al.　　　　　　　　　　　(45) Date of Patent:　　　Jul. 21, 2026

(54) METHOD AND SYSTEM FOR ESTIMATING POSTURE OF ROBOT

(71) Applicant: AJOU UNIVERSITY INDUSTRY-ACADEMIC COOPERATION FOUNDATION, Suwon-si (KR)

(72) Inventors: Jung Won Lee, Suwon-Si (KR); Dong Yeon Yoo, Suwon-Si (KR); Dong-Hee Yun, Suwon-Si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 17 days.

(21) Appl. No.: 18/965,506

(22) Filed: Dec. 2, 2024

(65) Prior Publication Data

US 2025/0214236 A1　　Jul. 3, 2025

(30) Foreign Application Priority Data

Dec. 28, 2023　　(KR) ......................... 10-2023-0195699
Feb. 1, 2024　　(KR) ......................... 10-2024-0016081

(51) Int. Cl.
B25J 9/16　　　　　(2006.01)

(52) U.S. Cl.
CPC ........... B25J 9/1653 (2013.01); B25J 9/1664 (2013.01)

(58) Field of Classification Search
CPC ...... B25J 9/1653; B25J 9/1664; B25J 9/1656; B25J 9/1697
See application file for complete search history.

(56) References Cited

U.S. PATENT DOCUMENTS

| | | | | |
|---|---|---|---|---|
| 11,030,770 | B2 * | 6/2021 | Tanaka ...................... | G06T 1/00 |
| 2016/0117824 | A1 * | 4/2016 | Amma ...................... | G06T 7/73 |
| | | | | 382/103 |

(Continued)

FOREIGN PATENT DOCUMENTS

| | | | |
|---|---|---|---|
| DE | 10-2018-124595 A1 | 4/2020 | |
| JP | 2021-096607 A | 6/2021 | |
| JP | 2023007886 A * | 1/2023 | ............. G05B 19/42 |

OTHER PUBLICATIONS

Machine translation of JP2023007886A.*

(Continued)

*Primary Examiner* — Robert T Nguyen
(74) *Attorney, Agent, or Firm* — Harness, Dickey & Pierce, P.L.C.

(57)　　　　　　ABSTRACT

A method of estimating a posture of a robot is disclosed. The posture estimation method of the robot according to the present disclosure includes: generating a first marker and at least one second marker and attaching them to the robot; collecting an image including the first marker and at least one of the plurality of second markers; estimating position information and rotation information of the first marker and each of the second markers; deriving the position information and the rotation information of the first marker depending on a relative positional relationship between the first marker and each of the second markers when the first marker is not identified; and estimating a posture of the robot based on the position information and the rotation information of the first marker.

6 Claims, 11 Drawing Sheets

(56)                     References Cited

U.S. PATENT DOCUMENTS

| 2021/0023719 | A1 |   | 1/2021 | Alt et al. | |
| 2022/0241033 | A1 |   | 8/2022 | Sandelson et al. | |
| 2025/0214236 | A1 | * | 7/2025 | Lee ........................ | B25J 9/1664 |

OTHER PUBLICATIONS

D.K. Bilal et al., "Development of a Vision Based Pose Estimation System for Robotic Machining and Improving Its Accuracy Using LSTM Neural Networks and Sparse Regression", Robotics and Computer-Integrated Manufacturing, Jul. 20, 2020, pp. 1-27.

Yun, Ajou University, "Vision-Based Collaborative Robot Posture Tracking and Articulation Defect Diagnosis Method", 58 pages, published Aug. 22, 2023, http://www.dcollection.net/handler/ajou/000000033087 <https://url.us.m.mimecastprotect.com/s/WqYHCYEQWrc641p3COfAHxWOP -?domain=dcollection.net> (and English Abstract).

Decision to Grant a Patent for corresponding Japanese Patent Application No. 2024-139967 dated Apr. 7, 2026, with English translation (7 Pages).

* cited by examiner

Figure 3:
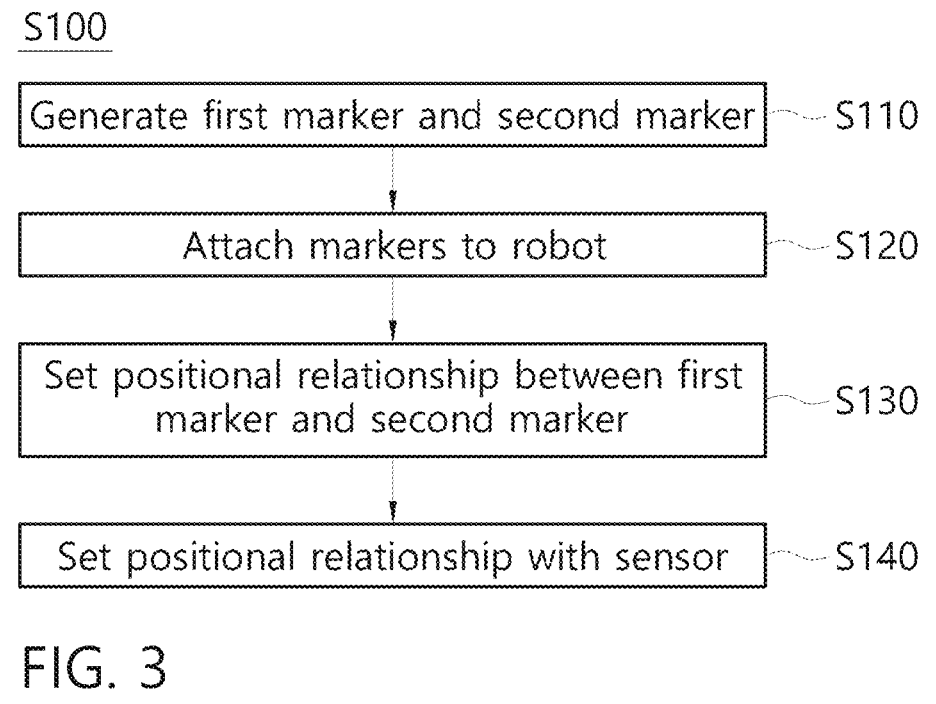

S100

Generate first marker and second marker ---- S110

↓

Attach markers to robot ---- S120

↓

Set positional relationship between first
marker and second marker ---- S130

↓

Set positional relationship with sensor ---- S140

METHOD AND SYSTEM FOR ESTIMATING POSTURE OF ROBOT

CROSS-REFERENCE TO RELATED APPLICATION

This application claims priority to and the benefit both of Korean Patent Applications No. 10-2023-0195699 filed on Dec. 28, 2023 and No. 10-2024-0016081 filed on Feb. 1, 2024, the disclosures of which are incorporated herein by reference in their entireties.

FIELD

The present disclosure relates to a method and system for estimating a posture of a robot.

BACKGROUND OF THE INVENTION

Cooperative robots can improve the productivity of factories by collaborating with other devices or workers, but there is a need for a technology that can identify defects in advance and maintain them as much as working together with a person.

If the defects are diagnosed using internal data produced for the driving and control of the cooperative robots, they can proceed without additional hardware installation, but the data that can be collected varies depending on the type of the robots, and since the movements are internally corrected for accurate driving, there is a possibility that the characteristics of the defects are not properly reflected in the internal data.

In addition, even for the same type of robots, the criteria for detecting the defects are different depending on the program and environment to be performed.

As a way to solve these problems, external vision sensors may be also used to detect the defects of the robots. When the external vision sensor using the method of attaching a marker to the robots is used, a defect detection system that is independent of the robot motion can be constructed.

Using this, it is possible to estimate the moving path of the robot through continuous photographing of the marker and detect abnormalities and defects by comparing it with normal driving. However, the position of the robot cannot be estimated at the time the marker is obscured, and only the position of the marker can be estimated by the conventional technique, and the exact posture of the joint and link of the robot cannot be estimated.

In addition, when recognizing the position of the marker using multiple cameras, camera installation may be limited depending on the working environment.

SUMMARY

The technical problem to be solved by the present disclosure is to provide a method and system for estimating a posture of a robot that can accurately estimate the position of one marker by another marker even when one marker is obscured by applying at least one marker to the robot and estimate the posture of the robot based on the result.

In order to solve the above technical problem, a method of estimating a posture of a robot according to an embodiment of the present disclosure may be executed by one or more processors of a computer device, and may include generating a first marker and at least one second marker and attaching them to the robot; collecting an image including the first marker and at least one of the plurality of second markers; estimating position information and rotation information of the first marker and each of the second markers; deriving the position information and the rotation information of the first marker depending on a relative positional relationship between the first marker and each of the second markers when the first marker is not identified; and estimating a posture of the robot based on the position information and the rotation information of the first marker.

In an embodiment of the present disclosure, the first marker may be attached to an end-effector of the robot.

In an embodiment of the present disclosure, the method may further include setting the positional relationship between the first marker and each of the second marker attached to the robot, wherein the positional relationship is derived by analyzing an image generated by simultaneously photographing the first marker and the second marker.

In an embodiment of the present disclosure, state information of the first marker is derived in plural depending on the positional relationship between the first marker and each of the plurality of second markers, and further comprising: selecting one of the state information of the first marker derived in plural.

In an embodiment of the present disclosure, the posture of the robot is estimated by a machine learning module in which a relationship between the state information of the first marker and the posture of the robot is previously learned.

In order to solve the above technical problem, a system for estimating a posture of a robot according to an embodiment of the present disclosure may include a first marker and at least one second marker attached to the robot; a sensor configured to collect an image including the first marker and at least one of the plurality of second markers; and a processor configured to estimate position information and rotation information of the first marker and each of the second markers, derive the position information and the rotation information of the first marker depending on a relative positional relationship between the first marker and each of the second markers when the first marker is not identified, and estimate a posture of the robot based on the position information and the rotation information of the first marker.

The present disclosure has an effect of estimating the position of the marker accurately even when one marker is obscured by applying at least one marker to the robot and estimating the posture of the robot based on this result.

BRIEF DESCRIPTION OF THE DRAWINGS

FIG. 3 shows in detail some configurations of a method for estimating a posture of a robot according to an embodiment of the present disclosure.

DETAILED DESCRIPTION OF THE PREFERRED EMBODIMENTS OF THE INVENTION

Figure 1:
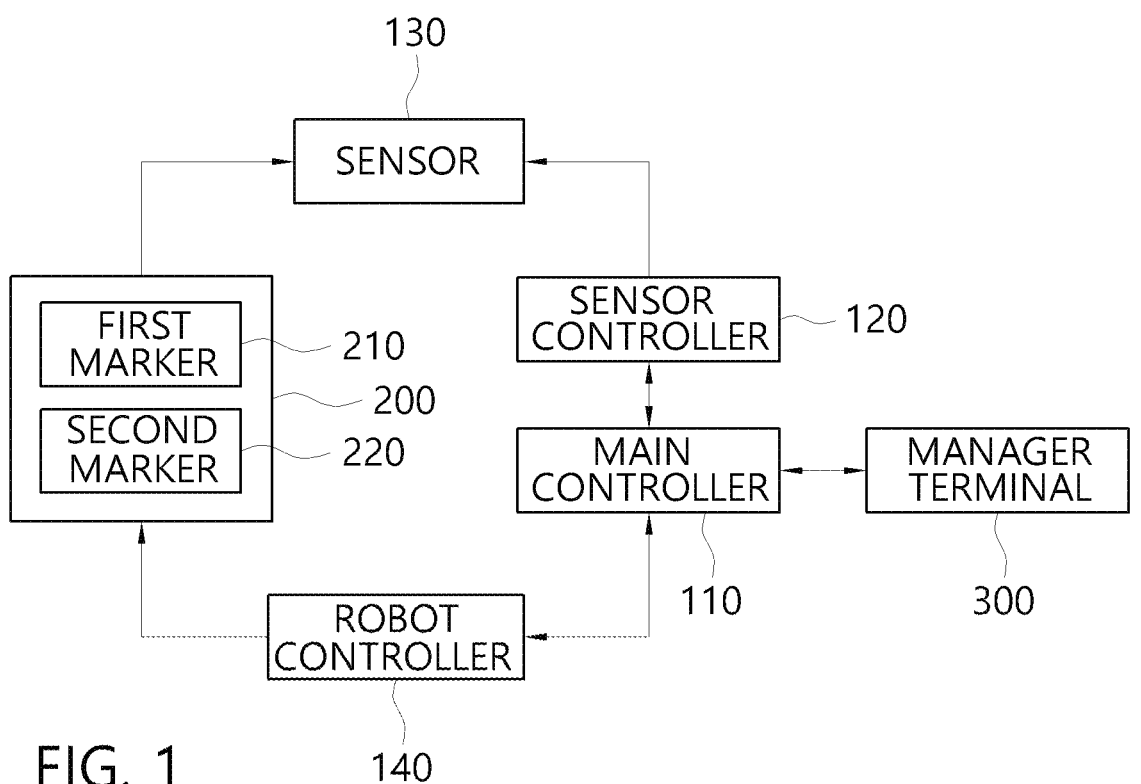
FIG. 1 shows a system for estimating a posture of a robot according to an embodiment of the present disclosure.

The present disclosure may be subjected to various transformations and have various embodiments, and specific embodiments are illustrated in the drawings and will be described in detail. However, this is not intended to limit the present disclosure to specific embodiments, and it should be understood that they include all transformations, equivalents, and alternatives included in the spirit and technical scope of the present disclosure.

In the description of the present disclosure, a detailed description of related known techniques will be omitted when it is judged that the subject matter of the present disclosure may obscure.

Hereinafter, embodiments of the present disclosure will be described in detail with reference to the accompanying drawings.

FIG. 1 shows a system for estimating a posture of a robot according to an embodiment of the present disclosure.

Referring to FIG. 1, the posture estimation system of the robot according to an embodiment of the present disclosure may include a main controller 110, a sensor controller 120, a sensor 130, a robot controller 140, a first marker 210, and a second marker 220.

The main controller 110 is connected to the sensor controller 120 and the robot controller 140 to control them. The main controller 110 may be connected to the manager terminal 300 via a wired/wireless network to transmit and receive information.

The main controller 110 may be a control device including a processor, a memory, an input interface, etc. For example, it may be composed of a desktop computer, a notebook, or a device that performs a similar function.

The sensor controller 120 may control the sensor 130 according to the control of the main controller 110.

Although the sensor controller 120 is shown to be physically separated from the main controller 110, the sensor controller 120 may be configured as a program embedded in the main controller 110. In this case, the main controller 110 may directly control the sensor 130.

The sensor 130 is connected to the sensor controller 120 and operates based on the control of the sensor controller 120.

The sensor 130 may include an image sensor. For example, the sensor 130 may include a camera.

In an embodiment of the present disclosure, the sensor 130 may include only one camera. However, multiple cameras may be embedded to improve image quality such as resolution, but their positions may be determined as one. In this case, one position may mean a position where one physical entity is placed, even if it is not an exact same position. In other words, image sensing by multiple cameras that are spatially significantly apart may be different from the main purpose of the present disclosure. However, it is not limited thereto.

The robot controller 140 is connected to the main controller 110 and the robot, and may control the robot by the control of the main controller 110. However, the present embodiment is not necessarily limited thereto, and the robot controller 140 may be arranged, connected, and set to control the robot independently of the main controller 110.

According to an embodiment, the robot controller 140 may also be configured as a program embedded in the main controller 110.

The first marker 210 is attached to the robot and the image may be acquired by the sensor 130.

Specifically, the first marker 210 may be attached to an end-effector of the robot.

The end-effector refers to a part that has a function of directly acting on a work object when the robot performs work. For example, grippers, welding torches, spray guns, nut runners correspond to end-effector.

Attaching the first marker 210 to the end-effector is for estimating a Tool Center Point (TCP) position, and the first marker 210 is also indicated as $M_{TCP}$.

The second marker 220 is attached to the robot, and its image may be acquired by the sensor 130.

The second marker 220 may be attached to have a relative positional relationship from the first marker 210.

For example, the second marker 220 may be attached to each of the four sides of the end-effector, not the TCP, even if it is attached to the end-effector.

The second marker 220 is also indicated as $M_{SUB}$ as an auxiliary means for estimating the position of the first marker 210 even when the first marker 210 is not sensed.

Figure 7:
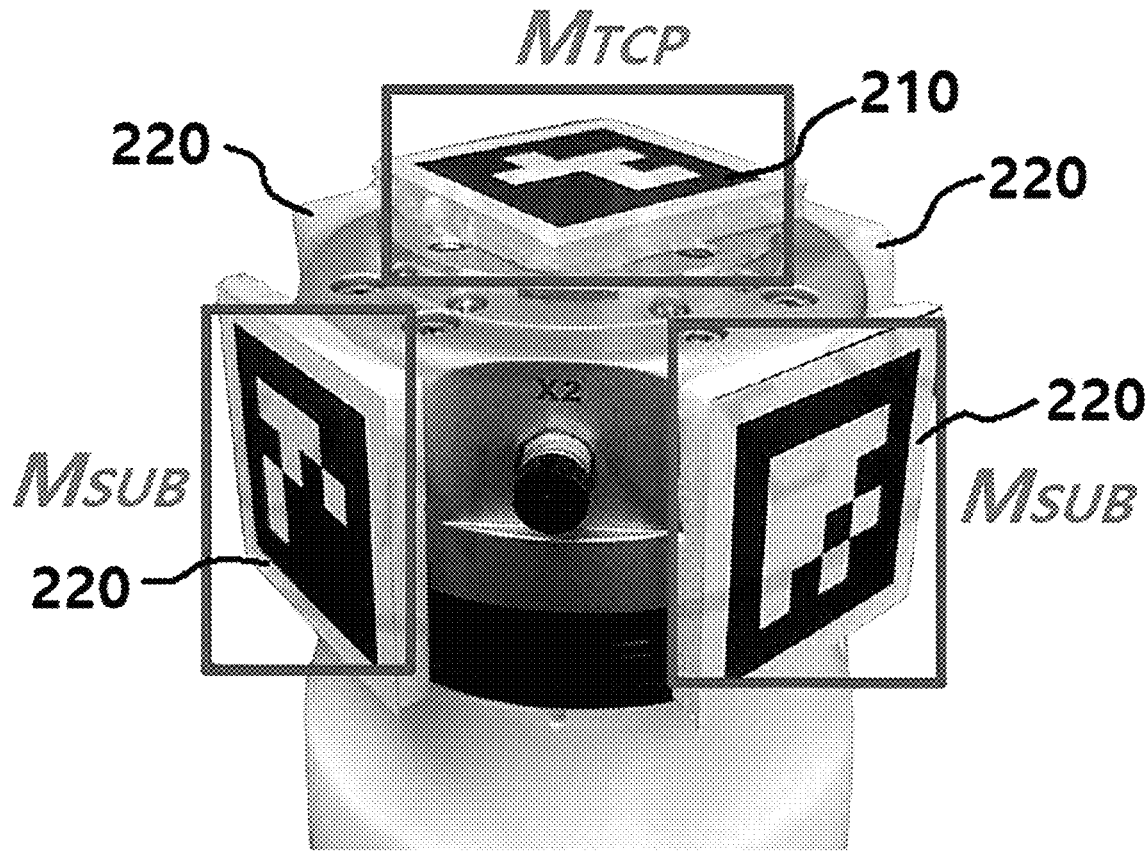
FIG. 7 shows a state in which a marker is attached to a robot.

FIG. 7 illustrates a state in which a marker is attached to a robot. Referring to FIG. 7, in an embodiment of the present disclosure, the first marker 210 is attached at the TCP position, which is the center of the upper part of the end-effector, and the four second markers 220 are attached at intervals of 90 degrees along the circumference of the side surface of the end-effector.

Although not illustrated in the drawings, the manager terminal 300 may include a controller, a communicator, a storage, and an input unit.

The controller may be connected to the communicator, the storage, and the input unit to control them.

The communicator may transmit and receive information to and from the main controller 110.

The storage may store the necessary information to provide convenience in information processing. The storage may store an application that may be installed in the manager terminal 300.

The input unit may be configured as a keyboard or a touch screen as an input interface for controlling the manager terminal 300.

The manager terminal configured as described above, for example, may be any one of a smartphone, a tablet PC, and a notebook, and is not limited to the above embodiment as long as the manager terminal may perform the above functions even if not the same.

The person who owns and uses the manager terminal 300 may be an administrator that operates the posture estimation system of the robot of the present disclosure. The manager terminal 300 may be used to receive related information from the system or to set and transmit variables necessary for the system.

Hereinafter, a method for estimating a posture of a robot will be described based on the posture estimation system of the robot according to an embodiment of the present disclosure. Unless otherwise specified, it may be understood that the posture estimation method of the robot according to an embodiment of the present disclosure is performed by the posture estimation system of the robot or the cooperation of its sub-components.

Figure 2:
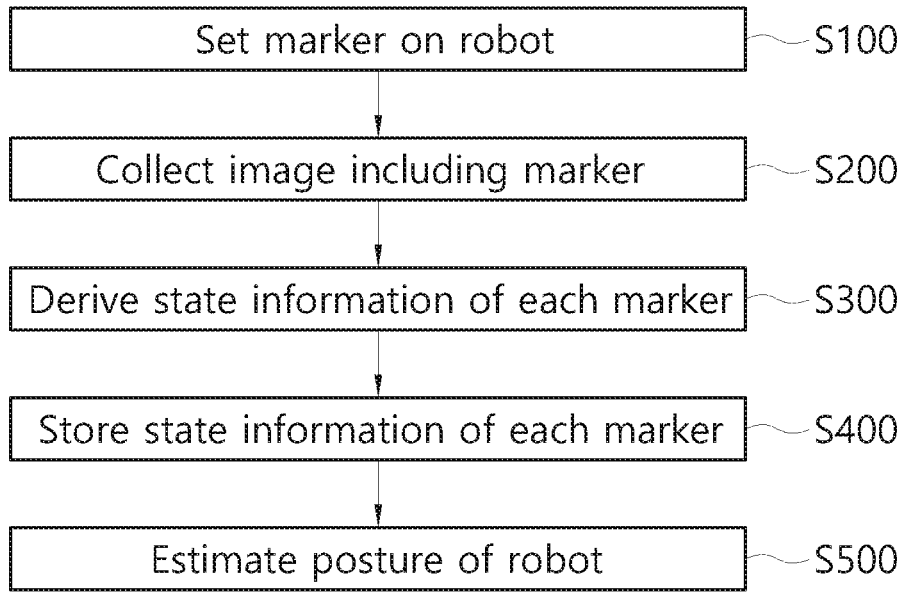
FIG. 2 shows a method of estimating a posture of a robot according to an embodiment of the present disclosure.

FIG. 2 shows a method of estimating a posture of a robot according to an embodiment of the present disclosure.

Referring to FIG. 2, in step S100, a marker is set on the robot.

FIG. 3 shows the step S100 in detail.

Referring to FIG. 3, in step S110, a first marker 210 and second markers 220 are generated, respectively.

Each marker may be generated in the same manner. For example, each marker may be generated according to the ArUco-based mark. The ArUco-based marker may consist of a two-dimensional bit pattern of size n'n and a black border area surrounding the same.

In step S120, the generated markers are attached to the robot. The first marker may be attached to the TCP, which is the center of the robot's end-effector, and the second markers may be attached at every 90 degree angle along the side surface of the robot's end-effectors.

In step S130, a positional relationship between the first marker 210 and the second marker 220 is set.

The positional relationship between the first marker 210 and the second marker 220 may be set by directly determining the state conversion value. The state includes position and rotation information. The state conversion value may be input directly to the main controller 110 or through the manager terminal 300.

The positional relationship between the first marker 210 and the second marker 220 may be set by simultaneously photographing them by the sensor 130, and then deriving the state conversion value by image processing.

A conversion vector of each marker denotes by t=[x,y,z] and a rotation vector denotes by r=[a,b,c].

When the variables necessary for the conversion are expressed as matrices, they are as follows: [Equation 1], [Equation 2], and [Equation 3], respectively.

$$\theta = \sqrt{a^2 + b^2 + c^2} \qquad \text{[Equation 1]}$$

Here, θ denotes the rotation angle between the camera and the marker.

$$v = \begin{bmatrix} \dfrac{a}{\theta}, & \dfrac{b}{\theta}, & \dfrac{c}{\theta} \end{bmatrix} \qquad \text{[Equation 2]}$$

Here, v denotes a rotation axis vector between the camera and the marker.

$$R = \cos\theta I + \sin\theta \begin{bmatrix} 0 & -v_x & v_y \\ v_x & 0 & -v_x \\ -v_y & v_x & 0 \end{bmatrix} + (1 - \cos\theta)vv^T \qquad \text{[Equation 3]}$$

Here, R denotes a rotation matrix for a camera coordinate system of the marker.

A three-dimensional coordinate conversion by Rodrigues Rotation may be represented by the combination of the rotation matrix and the conversion vector.

Figure 8:
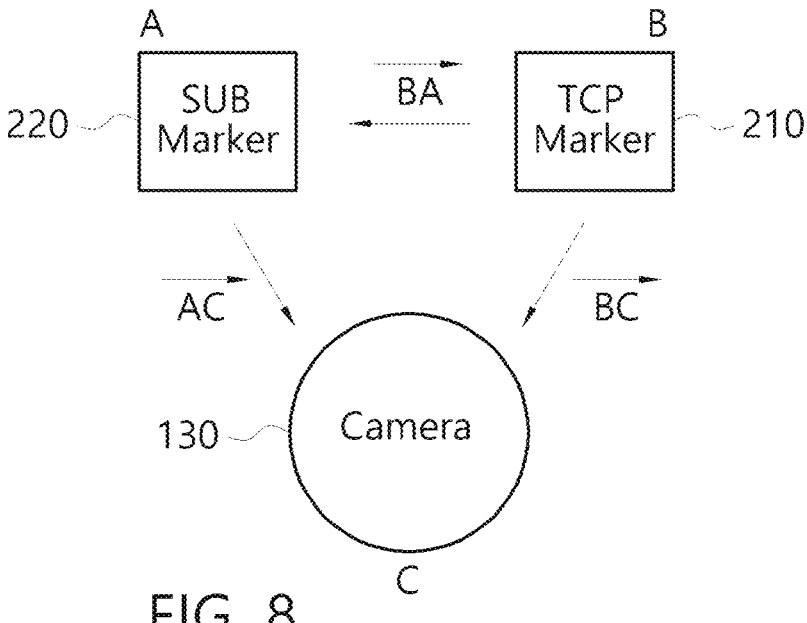
FIG. 8 shows a positional relationship of a first marker, a second marker, and a sensor.

FIG. 8 shows a positional relationship of the first marker, the second marker, and the sensor 130.

Referring to FIG. 8, the positional information of the first marker 210 in the coordinate system of the second marker 220 may be represented by $\overrightarrow{BA} = \overrightarrow{BC} + (-\overrightarrow{AC})$. When this is expressed as formulas for the rotation matrix and the conversion vector, they are as [Equation 4] and [Equation 5], respectively.

$$R_{TCP_{SUB}} = R_{SUB}^T \cdot R_{TCP} \qquad \text{[Equation 4]}$$

Here, $R_{TCP_{SUB}}$ denotes the rotation matrix of the first marker 210 in the coordinate system of the second marker 220.

$$t_{TCP_{SUB}} = R_{SUB}^T \cdot t_{TCP} + t_{SUB} \qquad \text{[Equation 5]}$$

Here, $t_{TCP_{SUB}}$ denotes the first marker 210 conversion vectors in the coordinate system of the second marker 220.

Referring again to FIG. 3, in step S140, the positional relationship between the sensor 130 and each marker is set.

The positional relationship between the sensor 130 and each marker may be obtained by image processing even when it is not directly set. Here, being obtained may mean that not only the positional relationship but also the status information of each marker is output based on the criterion.

According to an embodiment, the positional relationship between the sensor 130 and each marker may be set by directly determining the state conversion value. The state conversion value may be input to the main controller 110 directly or through the manager terminal 300.

Referring again to FIG. 2, in step S200, the sensor 130 collects an image of the robot including the marker.

The image obtained by the sensor 130 may be collected in units of frames.

The image obtained by the sensor 130 may include at least one of the image of the robot, the first marker 210, and the second marker 220.

In step S300, the main controller 110 derives the state information of each marker.

Figure 4:
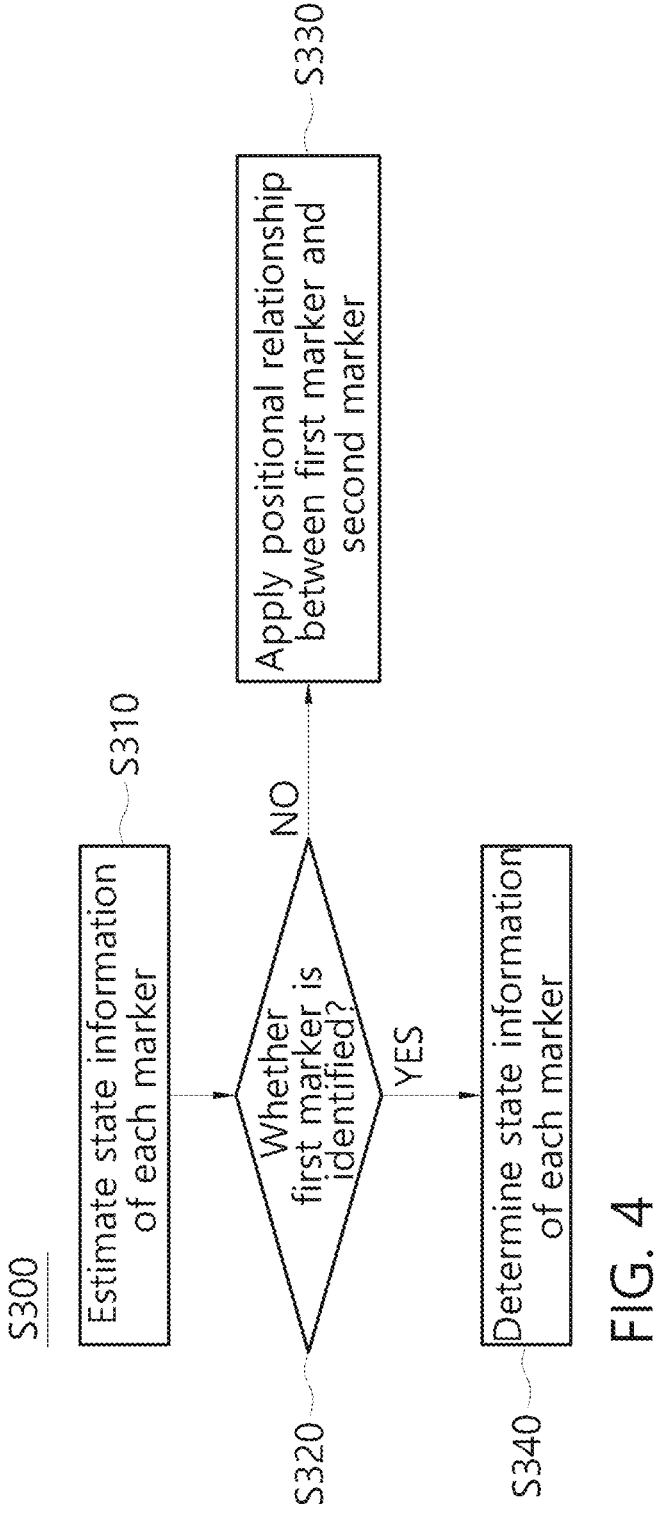
FIG. 4 shows in detail some configurations of a method for estimating a posture of a robot according to an embodiment of the present disclosure.

FIG. 4 shows the step S300 in detail.

Referring to FIG. 4, in step S310, the main controller 110 estimates the state information of each marker. The state information estimation of each marker will be described later with reference to FIG. 5.

In step S310, the position and rotation information of the first marker 210 and the second marker 220 may be estimated.

In step S320, the main controller 110 determines whether the first marker 210 is identified. If the first marker is identified, it proceeds to step S340, and if the first marker is not identified, it proceeds to step S330.

Here, the fact that the first marker 210 is not identified may mean that the state information of the first marker 210 cannot be estimated by the method of step S310 due to a situation in which the first marker 210 is not captured by the camera due to a motion change of the robot.

In step S330, the main controller 110 derives the state information of the first marker 210 by applying the positional relationship between the first marker 210 and the second marker 220.

The positional relationship between the first marker 210 and the second marker 220 is the same as the relationship in [Equation 4] and [Equation 5]. It is a goal to extract the state information of the first marker 210 in the coordinate system of the sensor 130 from the above equations. The state information of $M_{TCP}$ may be obtained as $\overrightarrow{BC}=\overrightarrow{BA}+\overrightarrow{AC}$ with reference to FIG. 8. Accordingly, the rotation matrix and the conversion vector with respect to BC are obtained as shown in [Equation 6] and [Equation 7], respectively.

$$R_{TCP} = R_{SUB} \cdot R_{TCP_{SUB}} \qquad \text{[Equation 6]}$$

$$t_{TCP} = R_{SUB} \cdot t_{TCP_{SUB}} + t_{SUB} \qquad \text{[Equation 7]}$$

According to [Equation 6] and [Equation 7], since the rotation matrix and the conversion vector in the coordinate system of the sensor 130 of the first marker 210 are obtained, so that the relative state information of the sensor 130 of the first marker 210 may be specified.

In an embodiment of the present disclosure, the second marker 220 is composed of four. Therefore, the rotation matrix and the conversion vector (or the state information according to it) obtained by the above process may be stored in four sets. In this case, an optimal value may be selected for the state information of the first marker 210 according to the setting criteria.

In step S340, the controller determines the state information of each marker. Determining the state information may be to determine the state information of the estimated marker as it is, but if there are a plurality of state information candidates, one of them may be selected.

For example, even when the first marker 210 is identified in step S320, the state information of the first marker 210 may be generated by the second marker 220 by proceeding to step S330. In this case, the state information of the first marker 210 may be stored in a maximum of five sets. The main controller 110 may select the optimum state information according to the setting criteria from among the five sets.

The optimum state information may be, for example, a value closest to an appropriate position between the position at a previous time and the position at a later time when a plurality of frames exist. The appropriate position may be set by various methods such as, for example, an average value and a median value. However, since the appropriate position may take into account a natural movement of the robot, but the unnatural movement information such as shaking may actually occur, if a plurality of sets of state information show similar information even if it is not the natural movement, the information may be selected as optimum state information.

For example, if the first marker 210 is not identified, any one of the state information of the first marker 210 derived from up to four second markers 220 generated in step S330 may be selected and stored.

Figure 5:
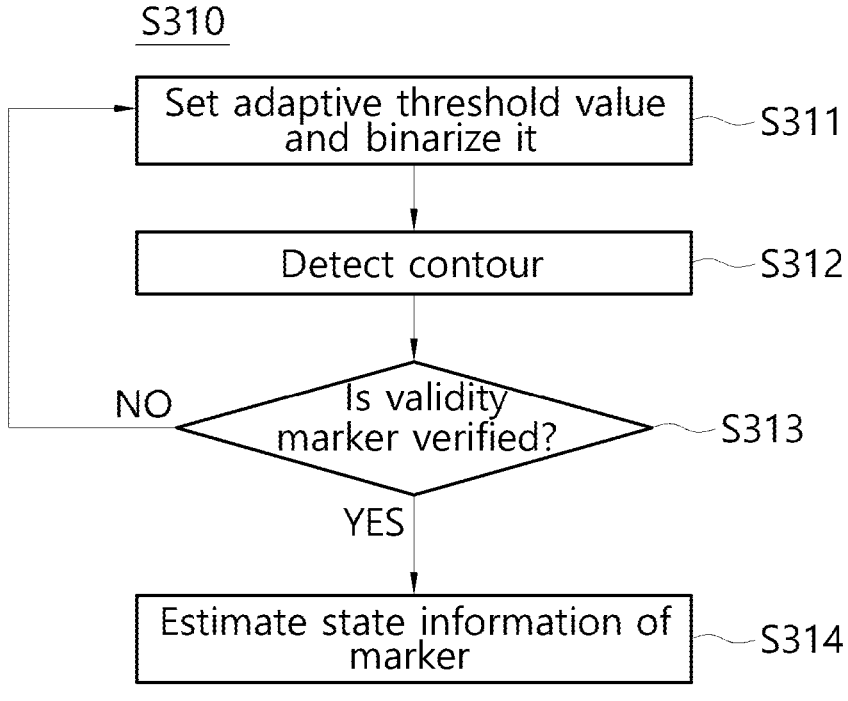
FIG. 5 shows in detail some configurations of a method for estimating a posture of a robot according to an embodiment of the present disclosure.

FIG. 5 shows the step S310 in detail.

In step S311, the main controller 110 sets an adaptive threshold value for the sensed image and binarizes it. The adaptive threshold value means dynamically adjusting the optimum threshold value according to the brightness and lighting conditions of the image. The marker area is binarized based on the threshold value and is converted into a black and white binary image.

Dynamically adjusting the threshold value of the image may be done according to, for example, Otsu's algorithm.

In step S312, the main controller 110 detects a contour.

The detecting of the contour is a task of finding the outline boundary of an object in a binarized image, and is a process of finding an outline composed of pixels of the object. The contour line detection may be detected by using a contour detection and approximation algorithm. This allows the contour line of the marker for identifying an individual marker in the image to be extracted.

In step S313, the main controller 110 verifies the validity of the marker. If the validity is verified, it proceeds to step S314 and if the validity is not verified, it returns to step S311.

The validity verification is a task of identifying a reliable marker by checking the pattern, direction, size, and the like of the marker. In an embodiment of the present disclosure, it is checked whether the contour line of the marker detected in the contour detection step is a valid ArUco marker. The ArUco marker has specific patterns and rules because it is created in a constant format, and uses it to verify the validity of the detected marker.

If the validity of the marker is not verified, steps S311 to S313 may be repeated. However, errors may be repeated if the same operation is repeated for the same frame, and in the embodiment of the present disclosure, since it is assumed that there is a possibility of the errors in the first marker 210, the number of repetitions may be limited to a set number of times.

In step S314, the main controller 110 estimates the state information of the marker based on the markers verified by the contour line.

The estimation of the state information is a process of calculating the position of the marker with respect to the camera and estimating the 3D pose (position and direction) of the object.

Through this, the 3D state information of the marker is estimated from the 2D image obtained from the sensor 130. In this case, the extracted 3D state information of the marker is the position based on the sensor 130.

In step S500, the main controller 110 estimates the posture of the robot based on at least one of the determined state information of the first marker 210 and the second marker 220. The estimation of the posture of the robot may be estimating the movement of multiple joints and links included in the robot.

Figure 6:
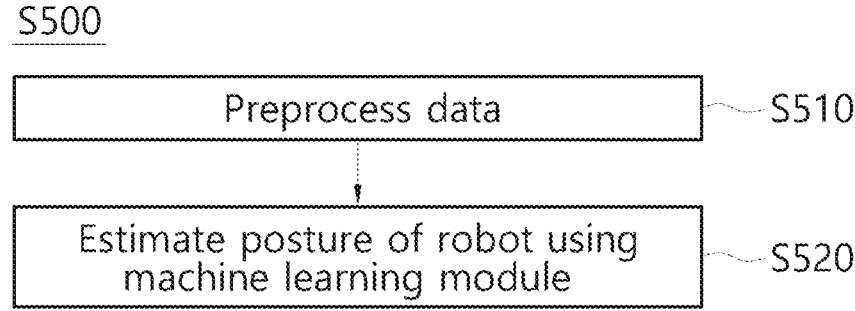
FIG. 6 shows in detail some configurations of a method for estimating a posture of a robot according to an embodiment of the present disclosure.

FIG. 6 shows in detail some configurations of a method for estimating a posture of a robot according to an embodiment of the present disclosure.

Referring to FIG. 6, in step S510, the main controller 110 preprocesses data regarding the state information of the first marker 210 and/or the second marker 220.

The preprocessing of the data may include, for example, correction or filtering on data exceeding a threshold (containing noise).

The sliding window average interpolation (SWAI) technique may be applied to the noise processing.

Figure 9:
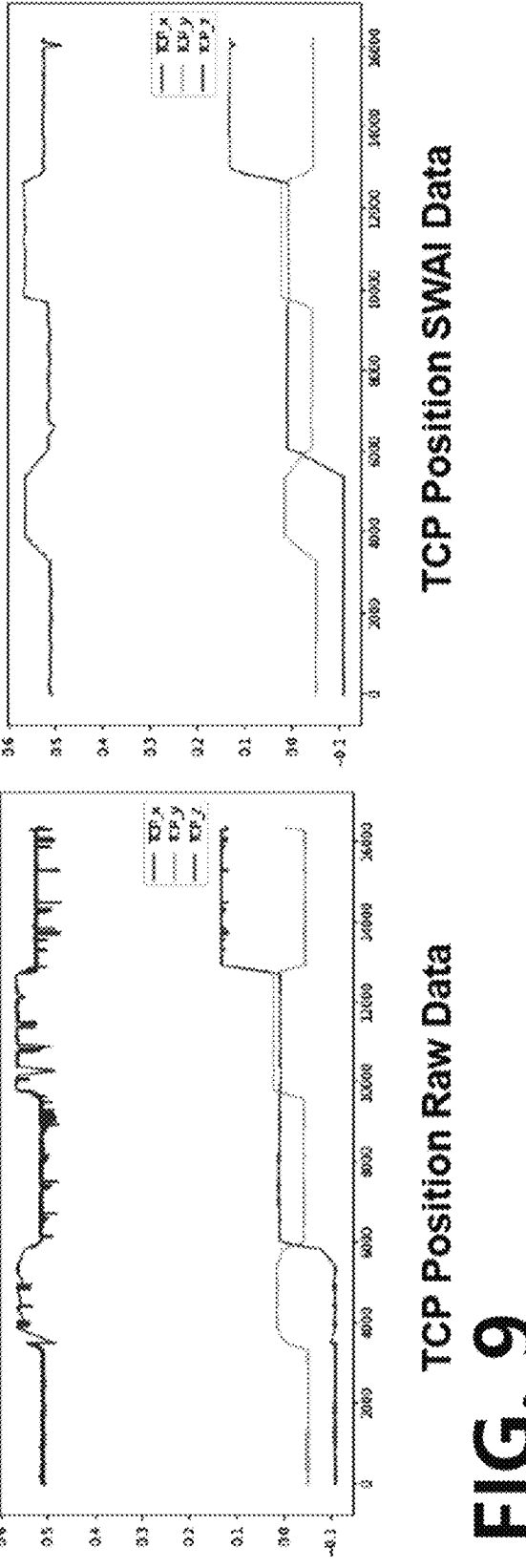
FIG. 9 is a graph comparing before and after data pre-processing.

Specifically, when photographing the marker attached to the robot using an external vision sensor, the intensity of light at a location where the robot is installed, partial occlusion of the marker by a singularity, and recognition errors depending on the photographing distance may occur. These environmental factors may be reflected in the image to obtain position data including noise such as an outlier or a missing value for the position data when the marker is detected, and the left side of FIG. 9 shows an example of the data including the noise. Sliding Window Average Interpolation and Min-Max Normalization techniques may be applied for noise processing included in time series data.

The left side of FIG. 9 shows data before preprocessing each coordinate value of the first marker 210, and the right side shows data after preprocessing.

Referring to FIG. 9, it can be seen that the information values of the data are smoothly connected by preprocessing.

Figure 10:
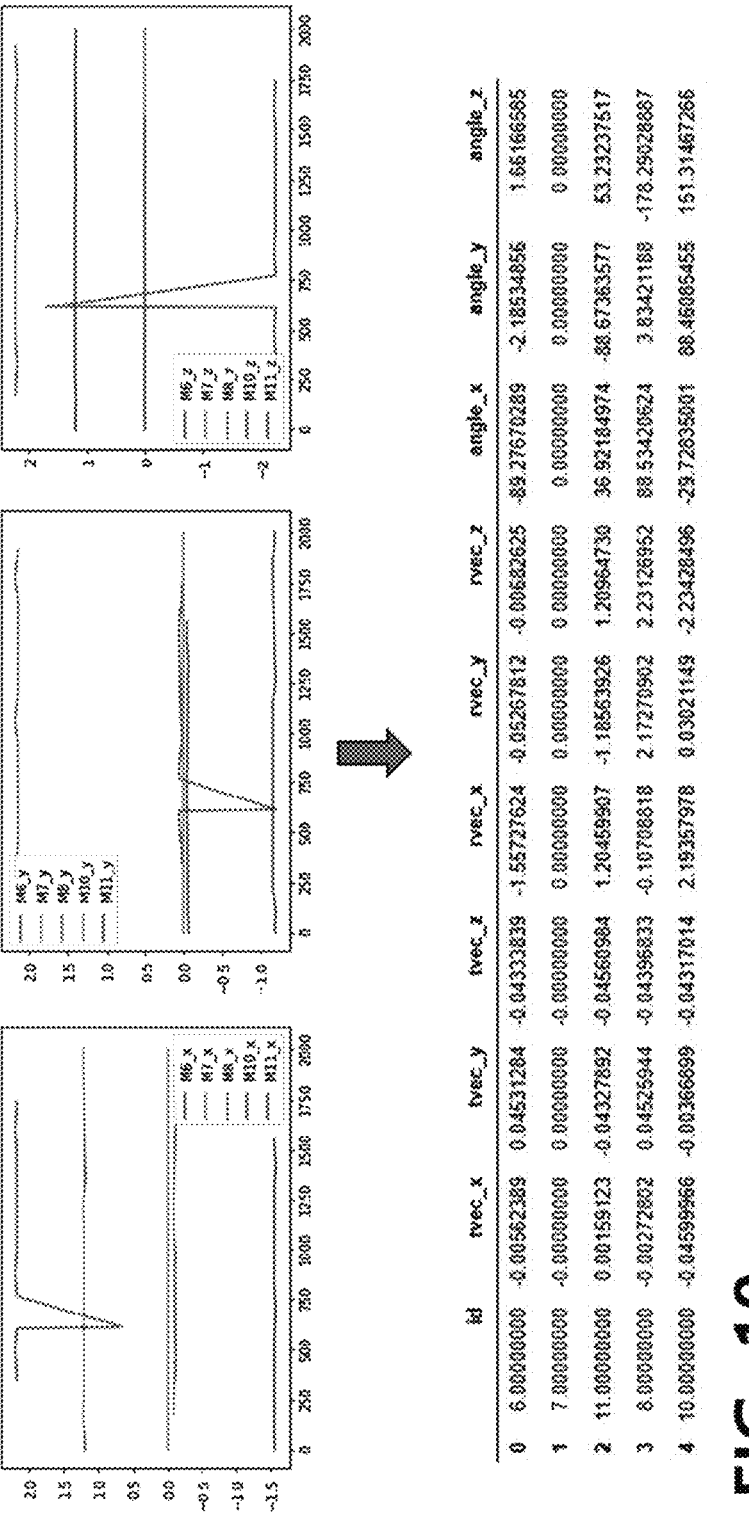
FIG. 10 is a graph and a table showing a positional relationship between markers.
Figure 11:
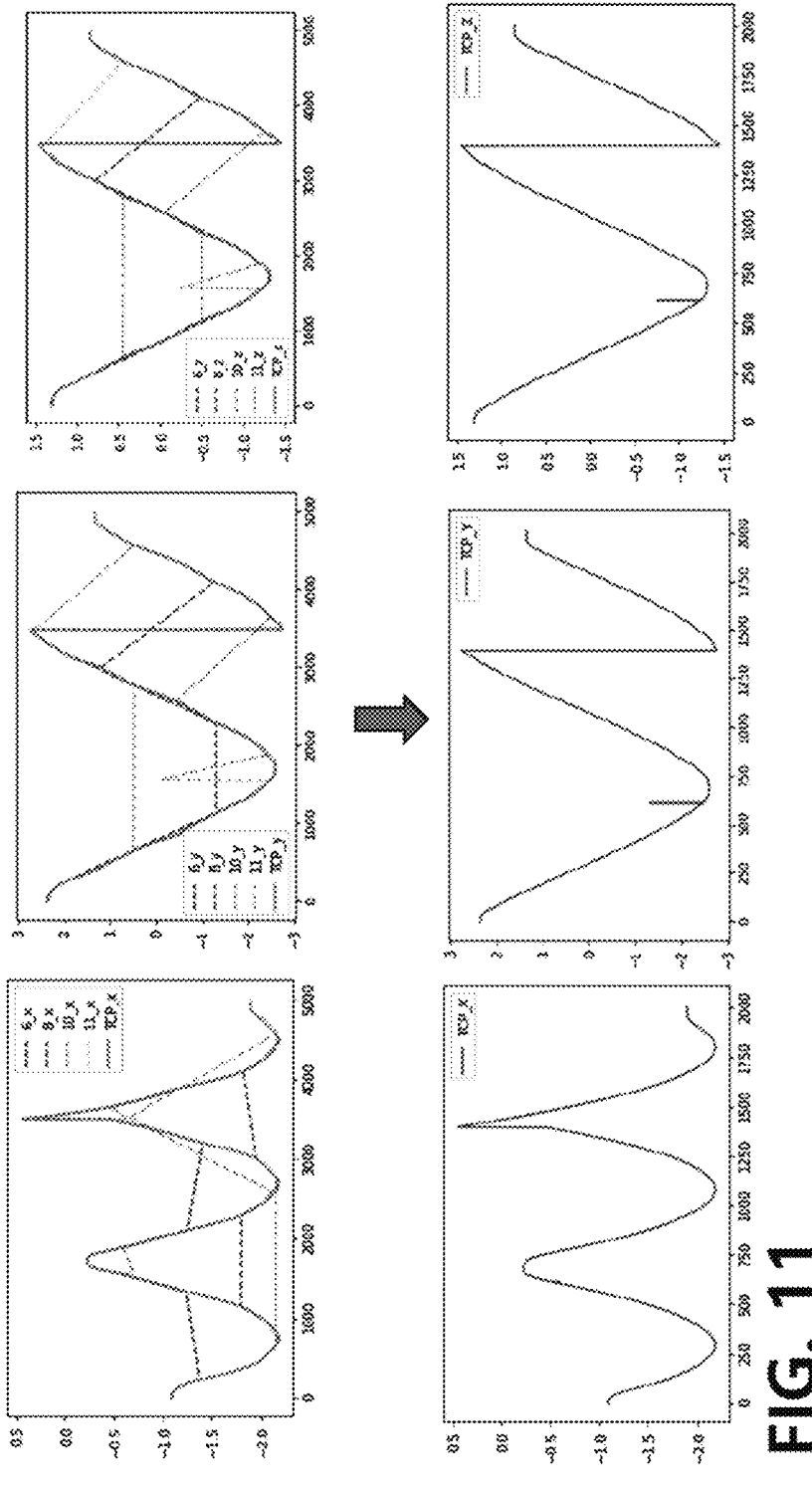
FIG. 11 graphically shows state information of markers.

FIG. 10 shows a positional relationship between markers applied to an actual robot, and FIG. 11 shows state information of the markers.

In each graph, the indices M6, M8, M10, and M11 represent the second marker 220, respectively. The index M7 represents the first marker 210.

FIG. 10 verifies the relationship between the second marker 220 and the first marker 210 as actual robot data.

On the other hand, referring to the top of FIG. 11, it may be seen that data with some markers obscured (not sensed) according to the operation of the robot (the data appears parallel to the horizontal axis). If the position of the first marker 210 is derived and organized by the data of the second markers 220 that may be observed, a continuous and smooth graph may be derived as shown in the graph at the bottom of FIG. 11.

In step S510, the main controller 110 inputs the preprocessed data to the machine learning module to estimate the posture of the robot.

The posture estimation of the robot may include pre-generating learning data related to the first marker 210 and the posture, learning the learning data to the machine learning module, and then applying the pre-processed input data.

The posture estimation of the robot may include determining the learning data by the state information and the data set related to the posture of the first marker 210 and each of the second marker 220, and then allowing the machine learning module to learn it.

The terminology used in the present application is used merely to describe specific embodiments, and is not intended to limit the present disclosure. In the present application, it should be understood that the terms such as "to include" or "to have" are intended to designate the presence of features, numbers, steps, operations, components, parts or combinations thereof described in the specification, and do not exclude the presence or addition of one or more other features, numbers, steps, operations, components, parts or combinations thereof.

What is claimed is:

1. A method of estimating a posture of a robot executed by one or more processors of a computer device, the method comprising:

generating a first marker and one or more second markers and attaching them to the robot;

collecting an image including the first marker and at least one of the one or more second markers;

estimating position information and rotation information of the first marker and each of the one or more second markers in the image;

deriving the position information and the rotation information of the first marker depending on a relative positional relationship between the first marker and each of the one or more second markers in the image when the first marker is not identified; and estimating a posture of the robot based on the position information and the rotation information of the first marker.

2. The method of claim 1, wherein the first marker is attached to an end-effector of the robot.

3. The method of claim 1, further comprising:

setting the positional relationship between the first marker and each of the one or more second markers attached to the robot, wherein the positional relationship between the first marker and a specific second marker is derived by analyzing an image generated by simultaneously photographing the first marker and the specific second marker.

4. The method of claim 1, wherein there are a plurality of second markers and state information of the first marker is derived in plural depending on the positional relationship between the first marker and each of the plurality of second markers in the image, and the method further comprising:

selecting one of the state information of the first marker derived in plural.

5. The method of claim 1, wherein the posture of the robot is estimated by a machine learning module in which a relationship between the state information of the first marker and the posture of the robot is previously learned.

6. A system for estimating a posture of a robot, the system comprising:

a first marker and one or more second markers attached to the robot;

a sensor configured to collect an image including the first marker and at least one of the one or more second markers; and a processor configured to:

estimate position information and rotation information of the first marker and each of the one or more second markers in the image, derive the position information and the rotation information of the first marker depending on a relative positional relationship between the first marker and each of the one or more second markers in the image when the first marker is not identified, and estimate a posture of the robot based on the position information and the rotation information of the first marker.

* * * * *